United States Patent [19]

Waller

[11] Patent Number: 4,734,690
[45] Date of Patent: Mar. 29, 1988

[54] METHOD AND APPARATUS FOR SPHERICAL PANNING

[75] Inventor: William G. Waller, Portland, Oreg.

[73] Assignee: Tektronix, Inc., Beaverton, Oreg.

[21] Appl. No.: 33,851

[22] Filed: Apr. 6, 1987

Related U.S. Application Data

[63] Continuation of Ser. No. 633,156, Jul. 20, 1984, abandoned.

[51] Int. Cl.$^4$ .............................................. G09G 1/02
[52] U.S. Cl. .................................... 340/729; 340/723; 340/727; 364/521; 364/522
[58] Field of Search ............... 340/723, 724, 727, 729, 340/731; 364/521, 522

[56] References Cited

U.S. PATENT DOCUMENTS 4,475,104 10/1984 Shen ..................................... 340/729
4,532,605 7/1985 Waller ................................. 340/731
4,549,275 10/1985 Sukonick ............................. 340/729

OTHER PUBLICATIONS

"The Adage Graphics Terminal"; by Thomas C. Hagen et al.; pp. 64-72; from Interactive Computer Graphics, IEEE Computer Society 1980.

"A Computer Program for Drawing in Three Dimensions"; by Timothy E. Johnson, pp. 20-26, from Interactive Computer Graphics, IEEE Computer Society 1980.

"A Procedure for Generating Visible Line Projections of Solids Bounded by Quadratic Surfaces"; by Peter Woon et al., from Information Processing 71, 1972.

IBM Technical Disclosure Bulletin; "Program for the Interactive Design of Polyhedra", by A. Appel et al.

*Primary Examiner*—Gerald L. Brigance
*Assistant Examiner*—Jeffery A. Brier
*Attorney, Agent, or Firm*—John P. Dellett; Robert S. Hulse

[57] ABSTRACT

A graphics display terminal performs a pan operation with respect to a view motion center to effectuate spherical panning, thereby providing perspective and non-perspective views. Three dimensional instructions stored in terminal memory are re-transformed in accordance with a panned direction. Also a zoom feature is provided so that displayed images may be magnified as desired.

12 Claims, 4 Drawing Figures

METHOD AND APPARATUS FOR SPHERICAL PANNING

This is a continuation of application Ser. No. 633,156, filed July 20, 1984 and now abandoned.

BACKGROUND OF THE INVENTION

The present invention relates to graphics terminals and particularly to graphics terminals providing the user with the ability to alter the apparent viewing direction of a display derived from locally stored data.

In a graphics terminal device, pictorial information can be displayed in two dimensions with the operator being given limited control over the arrangement of the viewed information. Thus, in my prior U.S. Pat. No. 4,532,605, a zoom feature is described wherein graphics instructions are received from a host computer and stored in local memory. For providing the zoom capability different scale factor transforms are applied to the conversion of the instructions into a representation in a pixel bit map memory.

Computer graphics information can also be given for the three dimensional case, but a two dimensional cathode ray tube screen is not usually capable of making use of the information. Although a number of different directional views may be calculated in a host computer and presented separately to a terminal, ordinarily a limited number of different views of the 3D information are possible and require appreciable time for recalculation and retransmission to the terminal. Other systems are available that recalculate a graphics image for each viewing frame, allowing considerable flexibility in movement of the image, but these systems are complex and expensive.

SUMMARY OF THE INVENTION

In accordance with the present invention in a particular embodiment thereof, three dimensional graphics information is received by a terminal in a fairly high level form and stored in local (i.e., terminal) memory. This information is converted in the terminal to information for storage in a pixel bit map memory which is then scanned to provide the display. In accordance with a feature of the present invention, the viewpoint of the observer is alterable at will so that he can view the stored information from different directions. In particular, a spherical panning system is contemplated wherein the user can "pan around" the display object and re-display the object from a different direction. A new viewing point and direction is calculated from changes in "longitude" and "latitude" input by the user, whereupon the input data is retransformed with respect to a new viewing direction. Also, a zoom feature is provided so that the display may be magnified as desired.

It is accordingly an object of the present invention to provide an improved method and apparatus for presenting three dimensional graphics information wherein the direction of viewing of the graphics information can be altered under local operator control.

It is another object of the present invention to provide an improved graphics terminal system having spherical pan and zoom capabilities relative to a displayed object.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters in general refer to like elements.

DETAILED DESCRIPTION

Figure 1:
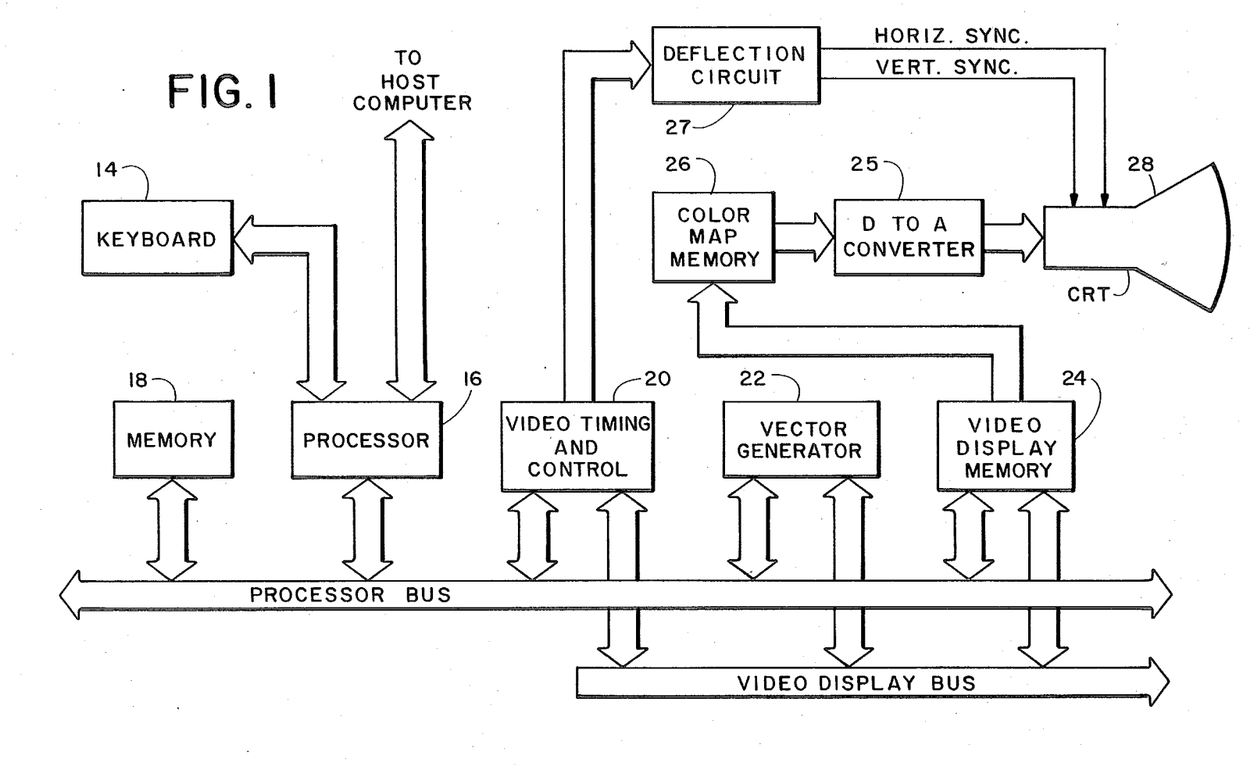
FIG. 1 is a block diagram of a system according to the present invention.

Referring to the drawings and particularly to FIG. 1, illustrating a terminal according to the present invention in block diagram form, keyboard 14 and a host computer are coupled to processor 16 which may comprise a type 8086 microprocessor manufactured by Intel Corporation. The processor 16 is connected to a processor bus to which a memory 18 is also connected. The microprocessor further includes a ROM (read only memory) in which firmware is stored. The host computer, or keyboard 14, sends original instructions, describing the displayed image, to processor 16, and these original instructions are stored in memory 18. In accordance with the present invention, the instructions stored may describe a 3D image utilizing vectors defined by X, Y and Z coordinates and directions.

A video display memory 24, which stores information in the form of a pixel bit map, receives the graphics data ultimately used for controlling the image on the CRT 28 during a raster scan. Vector generator 22 is connected to the processor bus and generates pixel data conforming to the original instructions stored in memory 18. Thus, the vector generator 22, which may be of a well-known type employing the Bresenham algorithm, receives the high level instructions and converts the same to a series of pixels (in 2D) that are mapped into memory 24. Video timing and control circuit 20 is also connected to the processor bus to coordinate the readout of the pixel data stored in the video display memory 24 with the generation of horizontal and vertical scans produced by the deflection circuit 27 in a conventional manner. The display memory 24 is read out via a color map memory or translator 26 wherein certain brightness values or color values are assigned to the pixels, for example when a color CRT is employed. The color map memory 26 supplies its information to the CRT through D to A converter 25 which converts the digital information in memory 26 to analog information.

In a particular embodiment, the pixels stored in pixel bit map memory 24 are four bits deep, i.e., each pixel is defined by four bits and these four bits can be translated into various selected color designating digital values via look-up in memory 26. If so desired, the output of video display memory 24 may be provided directly to a suitable D to A converter.

Figure 2:
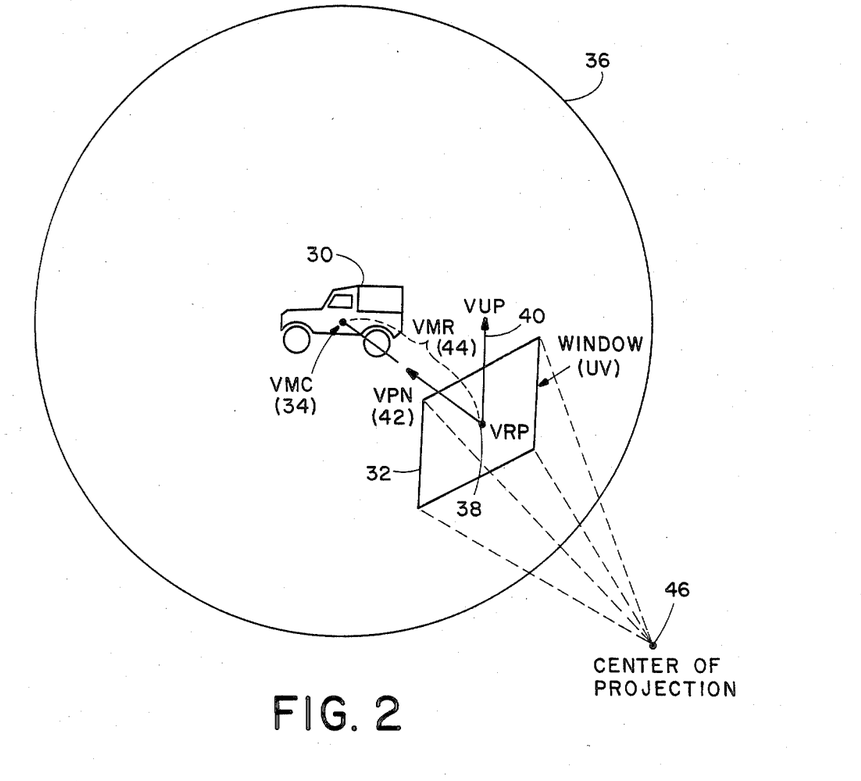
FIG. 2 is a first explanatory drawing illustrating operation of the spherical pan feature according to the present invention.

Referring to FIG. 2, the overall method of "spherical panning" according to the present invention will be described. It is first assumed that a graphics object 30 is presented for viewing on the terminal, e.g. on the face of CRT 28 illustrated in FIG. 1. The view (here of an automobile) is presented on the face of the CRT in response to high level vector instructions from the host computer as stored in memory 18, these instructions being converted to lines of individual pixels by vector generator 22 for entry into video display memory 24. Pursuant to raster scanning by deflection circuit 27, the pixels are presented on the screen of the CRT to form the original image 30. In accordance with prior art methods, the image 30 could be magnified or enlarged on the screen of the cathode ray tube, e.g. by the re-transformation of instructions in memory 18 via multiplication with a scale factor. However, in accordance with the present invention, the instructions in memory 18 are provided in X, Y, Z space for the presentation of a 3D image. In order to view the object 30 from a different direction, for example from the end of the automobile, a "window" 32 in a "U V" plane is positioned with respect to a view motion center (VMC) 34 and the information in memory 18 in FIG. 1 is re-transformed to supply a second display on the cathode ray tube screen as though it were viewed from the direction of the window 32.

In a particular embodiment, thumb wheels (or other suitable controls) are rotated to change the position of window 32 relative to an imaginary sphere 36 to which the window, and the U V plane containing the window, are tangent. The positioning of a frame box corresponding to the window on the actual cathode ray tube screen for identifying window position is further illustrated in FIG. 3. Through movement of the thumb wheels, changes in "latitude" and changes in "longitude" of the window are provided with respect to sphere 36, and pursuant to these changes a new view reference point (VRP) 38 is calculated together with a vector VUP 40 indicating the upward direction of the new view. Also re-calculated are the view plane normal (VPN) 42 (pointing at the object 30) together with the view movement radius (VMR) 44. Also, a center of projection 46 can be specified for the purpose of supplying a perspective view of the object, as though the eye point were at 46.

Figure 3:
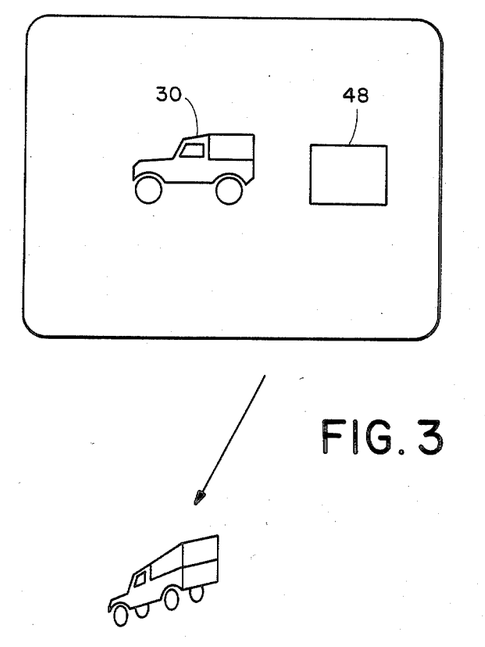
FIG. 3 is a view of a display according to the present invention illustrating an operator controllable frame box.

Referring to FIG. 3, frame box 48 used as a cursor is illustrated in superimposed relation to the cathode ray tube display. This frame box is comparable to window 32 in FIG. 2 and is utilized to "position" the window 32 relative to the object 30. It is movable about the screen of the CRT in a conventional manner in response to operator controlled instructions supplied by processor 16. It is seen the frame box has been moved to the right on the CRT screen, conveniently via rotation of thumb wheels not shown, so as to indicate longitudinal positioning to the right around sphere 36. Although the CRT screen is flat, movement of the frame box or cursor to the right in this mode is used for indicating movement the window 32 in a global manner around the right side of sphere 36 in FIG. 2. Similarly, the frame box in FIG. 3 can be moved left, upwardly and downwardly (via conventional means, suitably the aforementioned thumb wheels) for globally positioning the window 32 to the left around the object as well as "above" and "below" the object 30.

After the movement of the window 32 to the location shown in FIG. 2, the parameters illustrated in FIG. 2 are determined and the transform calculations are accomplished employing processor 16 for mapping a new view of the object 30 into the "viewport" of the cathode ray tube screen. This new view will present the display of the vehicle from the location of point 38 in FIG. 2, i.e., showing the left rear of the vehicle, utilizing the 3D graphics information stored in memory 18.

In addition to the movement of the viewpoint to provide spherical panning as hereinabove described, the radius of sphere 36 and/or the size of window 32 are adjustable in order to provide a zoom feature. Thus, not only can the object 30 be viewed from any desired angle, it can also be enlarged or made smaller in an appropriate manner. Reducing the radius of the sphere 36, i.e., reducing VMR 44, zooms in on the object to enlarge the same in a realistic manner where it is noted the center of projection point 46 is defined by a vector distance from VRP 38. Reducing the radius, VMR, is as though one were "walking toward" the object 30 with the perspective of the viewer changing accordingly.

Changing the size of the window 32 to provide zoom, and mapping the new view into the viewport represented by the cathode ray tube screen, produces magnification without the corresponding change in perspective, assuming the other parameters are left unchanged.

Figure 4:
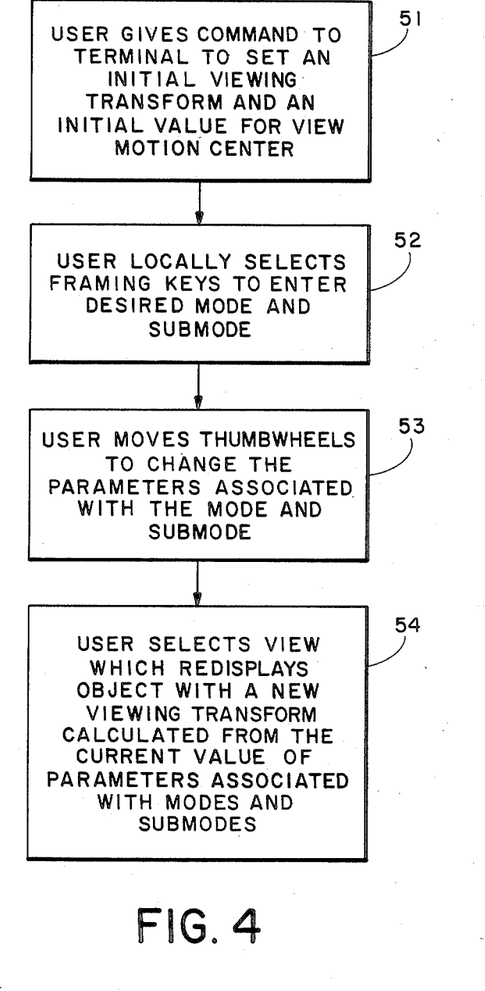
FIG. 4 is a flow chart illustrating the overall operation of the apparatus and method according to the present invention.

The operation of the present invention will be more clearly understood with reference to the flow chart of FIG. 4. First, the input from the host computer defines a three dimensional object, the vector definitions of which are stored in memory 18. For viewing this object, it is initially determined where the viewing reference point (38 in FIG. 2) is located, and an initial viewing transform is determined for locating pixels in response to the high level information in memory 18. This initial set-up is indicated by block 51 in the FIG. 4 flow chart. The transform is hereinafter more fully described. The object or objects to be displayed are defined in 3D coordinate space, called modeling (XYZ) space. By setting the parameters indicated in FIG. 2, a separate 3D viewing (UVW) space is defined in which the U axis points to the right of the observer, the V axis points upward and the W axis points away from the observer. Thus, the window 32 in FIG. 2 is in the U V plane. The 3D object or objects are displayed on a rectangular region of the screen of the terminal which is called the screen-viewport. This viewport may, for example, comprise the entire screen and the window 32 in FIG. 2 is mapped into this viewport, or the viewport may comprise a portion of the screen. Each point in the 3D modeling space is transformed into a point in screen space by using a 4×4 viewing-transform homogeneous matrix as hereinafter more fully indicated. A resultant 2D point (u',v') gives the screen location corresponding to the 3D point (x,y,z). The viewing-transform homogeneous matrix is calculated via the routine DspViewingTransform as hereinafter more fully described, utilizing the FIG. 2 vector information as input.

With the input information from memory 18 transformed to provide the initial view of the object, let us assume the user wishes to use the framing box to change the view. The user locally (that is at the terminal) selects "framing keys" to enter the desired mode and submode (block 52). The two modes comprise the pan mode and the zoom mode. The submodes for pan are (1) globe, for "walking around" the object via movement of the window in FIG. 2, (2) the sight submode, wherein the "pitch" and "yaw" of the image can be altered, and (3) the axial submode for controlling "roll" of the view. The zoom submodes are (1) radius, wherein zooming is accomplished by changing VMR in FIG. 2, (2) the window submode, wherein zooming is accomplished by changing the dimensions of window 32 in FIG. 2, (3) the eye submode, wherein the center of projection 46 in FIG. 2 is moved, and (4) the cut planes submode, wherein the view is restricted to take place between certain planes which can be disposed in intersecting relation with the object or objects. The user initially selects the mode and submode in order to determine the effect that movement of the control thumb wheels will have. Thus, if the user wants to pan the framing box around the defined sphere 36 in FIG. 2 to change latitude and longitude, the pan mode and the globe submode are selected.

In block 53 in FIG. 4, the user moves input thumb wheels to change the parameters associated with the mode and submode. Assuming, by way of example, that the pan mode and globe submode have been selected, the movement of the thumb wheels will have the eventual effect of moving the VRP 38 in FIG. 2 and the window 32 associated therewith in order to select the ensuing view. The routine DspViewingTransform is responsive to an input number provided by the delta U movement of the horizontal thumb wheel, and an input number provided by the delta V movement of the vertical thumb wheel, for calculating a new set of parameters corresponding to points and vectors in FIG. 2. After a move, we have to pass, to the transform, a new view plane normal 42, i.e. the vector pointing to the object. A final value of a vector "W3" points at the place you want to look next. A new reference point 38 is also determined. The VMC 34 can be ascertained pursuant to the location of VRP 38 and the radial distance VMR 44.

When the user operates the View key of the terminal, as noted in block 54 in FIG. 4, the newly selected view of the object is displayed through the use of a viewing transform calculated from the now current value of the parameters associated with the particular mode and submode, these values having been calculated from the amount and direction of rotation of the horizontal thumb wheel and the vertical thumb wheel. The 4×4 viewing-transform homogeneous matrix is employed to transform the high-level vector information in memory 18 into pixel information for storage in memory 24 as appropriate for the new view from the new direction.

It will be appreciated from the above, that after panning around the view motion center 34 in FIG. 2, to provide a different directional view of the stored 3D information, the zoom mode and submodes may be utilized for examining the object more closely.

The present system enables the receipt and local storage of 3D vector information, and provide a convenient way to locally examine the 3D object. The 3D object can be examined from any direction with any degree of magnification, while the 3D information defining the object remains in the local memory 18.

The operation of a particular embodiment of the present invention is described in greater detail as follows.

In addition to the other terms as hereinbefore described the terms head latitude (HdLat) and head longitude (HdLon) refer to the position of the head of the observer, as though the observer were tilting his head and wishes to view the object accordingly in the new view presented on the screen. These factors find utility with respect to the "sight" and "axis" submodes mentioned above.

The mathematics used for 3D images is described in several texts, including (1) W. M. Newman, R. F. Sproull, "Principles of Interactive Computer Graphics", 2nd ed. 1973 McGraw-Hill, pp. 333–356 and
(2) J. D. Foley, A. Van Dam, "Fundamentals of Interactive Computer Graphics", 1982 Addison-Weseley, pp. 267–316.

The objects to be displayed are defined in a right-handed 3D coordinate space called the modelling (XYZ) space. The observer defines a separate left-handed 3D viewing (UVW) space in which the U axis points to the right of the observer, the V axis points upward and the W axis points away from the observer. The 3D objects are displayed on a rectangular region of the screen of a terminal. This horizontally oriented region is called a screen-viewport. The lower-left hand corner of the terminal screen defines the origin of a 3D screen (U'V'W') space in which U' is parallel to U, V' is parallel to V and W' is parallel to W.

Each point (x,y,z) in the 3D modelling space is transformed into a point (u',v',w') in screen space by using the 4 by 4 viewing-transform homogeneous matrix $$A = \begin{pmatrix} A11 & A12 & A13 & A14 \\ A21 & A22 & A23 & A24 \\ A31 & A32 & A33 & A34 \\ A41 & A42 & A43 & A44 \end{pmatrix}$$

as follows:

$$u' = (x*A11 + y*A21 + z*A31 + A41)/d$$

$$v' = (x*A12 + y*A22 + z*A32 + A42)/d$$

$$w' = (x*A13 + y*A23 + z*A33 + A43)/d$$

where
$d = x*A14 + y*A24 + z*A34 + A44$.

The 2D point (u',v') gives the screen location corresponding to the 3D point (x,y,z) and w' gives the depth of that transformed point. This depth information may be used in systems that employ a z-buffer algorithm to remove hidden surfaces. The z-buffer algorithm is described in Newman and Sproull (pp. 369–371) and in Foley and Van Dam (pp. 560–561).

The routine ViewingTransform calculates the viewing-transform homogeneous matrix from the following input:
(1) view-reference-point (VRP): A point in the 3D XYZ modelling space specifying the origin of the left-handed UVW viewing space.
(2) view-plane-normal (VPN): A nonzero vector from the view-reference-point (in XYZ space) specifying the direction of the w axis of the UVW coordinate system.
(3) view-up (VUP): A nonzero vector from the view-reference-point (in XYZ space) which is not collinear with view-plane-normal. The projection of view-up on the UV-plane (i.e. the w=0 plane defines the direction of the v axis.
(4) UV-window: The lower-left and upper-right corners of a rectangular region parallel to the u and v axes and lying in the UV-plane. Neither the width nor the height of the UV-window can be zero.
(5) EyePosition: (Also called the Center-of-Projection) A vector specified in the UVW coordinate system, which gives the position of the "viewing eye" with respect to the center of the UV window. In persective projection, the image is projected onto the UV plane along rays that converge at the EyePosition. In parallel projection, the image is projected onto the UV plane along rays that are parallel to the line from the EyePosition to the center of the UV-window.

(6) ProjectionType:
1. if the viewing-transform homogeneous matrix is to be calculated for a parallel projection.
2. if the viewing-transform homogeneous matrix is to be calculated for a perspective projection. (The formulas for the viewing-transform matrix for these two cases is given in Foley and Van Dam.)

(7) screen-viewport: The lower-left and upper-right corners of a horizontally-aligned rectangular region of the screen of the terminal. That portion of the projected image contained in the UV-window is scaled and positioned so that it fully occupies the screen-viewport. Neither the width nor the height of the screen-viewport may be zero.

(8) front-distance: Any image whose perpendicular distance to the UV-pane is less than front-distance will not be displayed.

(9) back-distance: Any image whose perpendicular distance to the UV-pane is greater than back-distance will not be displayed.

The last input value is NOT used to calculate the viewing-transform matrix:

(10) view-motion-radius: The radius of a sphere, the surface of which defines a convenient 2D coordinate system so that the observer can locally pan about the center of the sphere with two thumbwheels. The center of the sphere is called the View-Motion-Center (VMC).

The routine ViewingTrans also calculates the following global values:

$$\underline{W} = \underline{VPN} / \|\underline{VPN}\|$$

where $\|\underline{VPN}\|$ represents the length of the vector $\underline{VPN}$ (view-plane-normal).

$$\underline{U} = (\underline{VPN} \times \underline{VUP}) / \|\underline{VPN} \times \underline{VUP}\|$$

where $\underline{VPN} \times \underline{VUP}$ represents the vector crossproduct of the view-plane-normal vector with the view-up vector.

$$\underline{V} = \underline{W} \times \underline{U}$$

The three vectors $\underline{U}, \underline{V}, \underline{W}$ form an left-handed set of orthonormal vectors.

Then the View-Motion-Center is given by $$\underline{VMC} = \underline{VRP} - (VMR)\underline{W}$$

The routine ViewingTransform sets the values of the following variables which are used by the framing system:

Radius: = View-Motion-Radius
LLu: = The u component of the lower-left corner of the UV-window
LLv: = The v component of the lower-left corner of the UV-window
URu: = The u component of the upper-right corner of the UV-window
URv: = The v component of the upper-right corner of the UV-window
WCu: = (LLu+URu)/2 {The u component of the UV-window center}
WCv: = (LLv+URv)/2 {The v component of the UV-window center}
DeltaU: = URu−LLu {The width of the UV-window}
DeltaV: = URv−LLv {The height of the UV-window}
EyeU: = the u component of the EyePosition
EyeV: = the v component of the EyePosition
EyeW: = the w component of the EyePosition
Wnear: = the value of front-distance
Wfar: = the value of back-distance The routine ViewingTransform can be used directly by the observer with a command to the terminal or it can be used indirectly by the firmware code for the framing system in which the observer locally changes the view of the 3D objects by rotating the two thumbwheels and pressing the VIEW key.

If the routine is used directly, then it also initializes some global variables as follows:

Lat: =0
Lon: =0
HdLat: =0
HdLon: =0
Rotate: =0
$\underline{U0}$: = $\underline{U}$
$\underline{V0}$: = $\underline{V}$
$\underline{W0}$: = $\underline{W}$ If the routine is called indirectly then it does NOT initialize those variables.

The framing portion of the firmware sets and changes the modes and submodes associated with local 3D zooming and panning by taking into account the strokes of the framing keys (ZOOM, PAN, NEXTVIEW and VIEW). These four keys, in conjunction with the SHIFT key and CTRL key, can indicate sixteen different operations because the firmware can detect if the SHIFT key or the CTRL key or both are pressed at the same time as one of the framing keys is pressed. Specifically, the 16 combinations are:

| | |
|---|---|
| ZOOM, | PAN, |
| SHIFT-ZOOM, | SHIFT-PAN, |
| CTRL-ZOOM, | CTRL-PAN, |
| SHIFT-CTRL-ZOOM, | SHIFT-CTRL-PAN, |
| NEXTVIEW, | VIEW, |
| SHIFT-NEXTVIEW, | SHIFT-VIEW, |
| CTRL-NEXTVIEW, | CTRL-VIEW, |
| SHIFT-CTRL-NEXTVIEW, | SHIFT-CTRL-VIEW, |

The framing portion of the firmware also changes the parameters associated with the modes and submodes of local 3D zooming and panning. It does this by using the amount and direction of rotation of the horizontal thumbwheel and the vertical thumbwheel. When the VIEW key is pressed, then the current values of the parameters that are adjustable by the framing system are used to calculate the appropriate input values to give to the ViewingTransform routine. This causes a different viewing-transform matrix to be defined so that the 3D objects are displayed from the new position indicated by the observer locally.

The modes and submodes of the framing system are determined by the key strokes given by the observer as follows:

Case of key combination

{Note: Mode = 0 : Not in framing mode}

```
                = 1 : 'ZOOM' mode
                = 2 : 'PAN' mode
    ZoomSubMode = 0 : 'Radius'    submode
                = 1 : 'Window'    submode
                = 2 : 'Eye'       submode
                = 3 : 'CutPlane'  submode
    PanSubmode  = 0 : 'Globe'     submode
                = 1 : 'Sight'     submode
                = 2 : 'Axial'     submode}
```

(ZOOM):
{If the ZOOM key is pressed while in 'ZOOM' mode then exit framing mode, otherwise enter 'ZOOM' mode}
If Mode=1 then Mode: =0
Else Mode: =1
End-If
(PAN):
{If the PAN key is pressed while in 'PAN' mode then exit framing mode, otherwise enter 'PAN' mode}
If Mode=2 then Mode: =0
Else Mode: =2
End-If
(SHIFT-ZOOM):
{If in 'ZOOM' mode, then cycle through the zoom submodes, otherwise enter 'ZOOM' mode}
If Mode=1 then
    ZoomSubMode: =ZoomSubMode+1
    If ZoomSubMode=4 then ZoomSubMode: =0
    End-If
Else
    Mode: =1
End-If
(SHIFT-PAN):
{If in 'PAN' mode, then cycle through the pan submodes, otherwise enter 'PAN' mode}
If Mode=2 then
    PanSubMode: =PanSubMode+1
    If PanSubMode=3 then PanSubMode: =0 End-If
Else
    Mode: =2
End-If
(CTRL-ZOOM):
{Change from perspective-projection to parallel-projecton or vice versa}
ProjectionMode: =3-ProjectionMode
(VIEW):
{Change the viewing transform according to the current parameters of all the submodes}
{angles in integer degrees}

$\underline{W1} = -\cos(Lat)^* \sin(Lon)\underline{U0} - \sin(Lat)\underline{V0} - \cos(Lat)^* \cos(Lon)\underline{W0}$ $\underline{V1} = -\sin(Lat)^* \sin(Lon)\underline{U0} + \cos(Lat)\underline{V0} - \sin(Lat)^* \cos(Lon)\underline{W0}$ $\underline{U1} = \underline{W1} \times \underline{V1}$ $\underline{W2} = \cos(HdLat)^* \sin(HdLon)\underline{U1} - \sin(HdLat)\underline{V1} - \cos(HdLat)^* \cos(HdLon)\underline{W1}$ $\underline{V2} = -\sin(HdLat)^* \sin(HdLon)\underline{U1} + \cos(HdLat)\underline{V1} + \sin(HdLat)^* \cos(HdLon)\underline{W1}$ $\underline{U2} = \underline{W2} \times \underline{V2}$ $\underline{U3} = \cos(Rotate)\underline{U2} - \sin(Rotate)\underline{V2}$ $\underline{V3} = \sin(Rotate)\underline{U2} + \cos(Rotate)\underline{V2}$ $\underline{W3} = \underline{W2}$ $\underline{VRP} = \underline{VMC} + Radius\underline{W}$ call ViewingTransform (indirectly) with the input:
(1) view-reference-point=VRP
(2) view-plane-normal=W3
(3) view-up=V3
(4) UV-window=(LLu,LLv),(URu,URv)
(5) EyePosition=(EyeU, EyeV, EyeW)
(6) ProjectionType=original Projection-Type {unchanged}
(7) screen-viewport=original screen-view-port {unchanged}
(8) front-distance=Wnear
(9) back-distance=Wfar
(10) view-motion-radius=Radius
End-Case The parameters associated with the modes and submodes of the framing system are changed by the thumbwheel motions as follows:
If either the horizontal or vertical thumbwheels were moved, then
Let DeltaH be the amount of rotation of the horizontal thumbwheel
Let DeltaV be the amount of rotation of the vertical thumbwheel.
If Mode=1 then
    If ZoomSubmode=0 then {'Radius' submode of 'Zoom' mode}
        Radius: =Radius * (DeltaH+DeltaV+512)/512
        Radius: =Maximum(Radius, 8)
        Radius: =Minimum(Radius, 16777215)
    End-If
    If ZoomSubmode=1 then {'window' submode of 'Zoom' mode}
        newDeltaU: =(URu-LLu) * (DeltaH+DeltaV+512)/512
        newDeltaV: =(DeltaV/DeltaU) * newDelU
        LLu: =WCu-(newDelU-DeltaU)/2
        URu: =LLu+newDeltaU
        LLv: =WCv-(newDelV-DeltaV)/2
        URv: =LLv+newDeltaV
    End-If
    If ZoomSubmode=2 then {'Eye' submode of 'Zoom' mode}
        EyeU: =EyeU * (DeltaH+DeltaV+512)/512
        EyeV: =EyeV * (DeltaH+DeltaV+512)/512
        EyeW: =EyeW * (DeltaH+DeltaV+512)/512
    End-If
    If ZoomSubmode=3 then {'CutPlane' submode of 'Zoom' mode}
        Wnear: =Wnear * (DeltaH+512)/512
        Wfar: =Wfar * (DeltaV+512)/512
    End-If
End-If {Mode=1}
If Mode=2 then
    If PanSubmode=0 then {'Globe' submode of 'Pan' mode}
        Lat: =Lat * (DeltaV+512)/512
        Lat: =Minimum(Lat, +90)
        Lat: =Maximum(Lat, -90)
        Lon: =Lon * (DeltaU+512)/512
        While Lon<-179 do
            Lon: =Lon+360
        End-While
        While Lon>+180 do

```
        Lon: =Lon−360
    End-While
End-If
If PanSubmode=1 then {'Sight' submode of 'Pan'
    mode}
    HdLat: =HdLat*(DeltaV+512)/512
    HdLat: =Minimum(HeadLat, +90)
    HdLat: =Maximum(HeadLat, −90)
    HdLon: =HdLon*(DeltaU+512)/512
    While HdLon< −179 do
        HdLon: =HdLon+360
    End-While
    While HdLon > +180 do
        HdLon: =HdLon −360
    End-While
End-If
If PanSubmode=2 then {'Axial' submode of 'Pan'
    mode}
    Rotate: =Rotate*(DeltaU+DeltaV+512)/512
    While Rotate < −179 do
        Rotate: =Rotate+360
    End-While
    While Rotate > +180 do
        Rotate: =Rotate −360
    End-While
End-If {Mod=2}
```

The program routine DspViewingTransform is described in Appendix A as follows.

APPENDIX A

Procedure ViewingTransform Input (1) @VRP (view-reference-point): A point in the 3D space specifying the origin of the left-handed uvw coordinate system.

(2) @VPN view-plane-normal): A nonzero vector from the view-reference-point (in xyz space) specifying the w axis of the uvw coordinate system.

(3) @VUP (view-up): A nonzero vector from the view-reference-point (in xyz space) which is not collinear with view-plane-normal. the projection of view-up on the uv-plane specifies the v axis.

(4) UV-window parameters:
   (@LLu, @LLv) specifies the lower left corner of the 3D viewing window which lies on the W=0 plane {UV-plane} in the UVW space.
   (@URu, @URv) specifies the upper right corner of that viewing window.

(5) @EyePosition: A vector specified in the UVW coordinate system, which gives the position of the "viewing eye" from the "center" of the uv-window on the UV plane. Since the UVW coordinate system is left-handed, the W-coordinate of eye-position must be less than zero to represent an actual eye-position value.

(6) @ProjectionType
   1 if parallel projection
   2 if perspective projection (7) Screen-viewport parameters:
   @XViewCorner specifies the left-most pixel of the screen-viewport.
   @XViewSize specifies the number of pixels in the width of the screen-viewport.
   @YViewCorner specifies the bottom-most pixel of the screen-viewport.
   @YViewSize specifies the number of pixels in the height of the screen-viewport.

{Note, for 3-dimensional symmetry, we also define @ZViewCorner and @ZViewSize to be the minimum value and depth of an "imaginary" 3D screen viewport. These values only affect the calculation of w', the depth of a point placed on the screen viewport. The value of w' can be used with z-buffer hardware.}

@ZViewCorner specifies the Minimum depth of the screen-viewport
   @ZViewSize specifies the depth of screen viewport (8) @FrontDistance—At the distance front-distance along the W axis (i.e. along the view-plane-normal vector) from the viewing plane resides the parallel Front clipping plane (called the Hither plane). The Front (Hither) plane is the w=front-distance plane in the UVW coordinate system.

(9) @BackDistance—At the distance back-distance along the W axis from the viewing plane resides the parallel Back clipping plane (called the Yon plane). The Back (Yon) plane is the w=back-distance plane in the UVW coordinate system.

(10) @View MotionRadius—The radius of curvature of a "Viewing-Sphere" which is tangent to the UV-Plane at the view-reference-point and lies on the positive W-axis side of the UV-plane.

The procedure ViewingTransform defines the UV viewing plane and associated viewing transform attributes which are associated with the current view.

The plane perpendicular to view-plane-normal passing through view-reference-point is called the viewing plane or the UV-plane. view-plane-normal specifies the positive W axis direction in the UVW coordinate space.

The view-plane-normal and view-up vectors are not defined as "points" in XYZ space, but instead represent direction vectors, defined with starting points at the origin (0,0,0).

The uv-window corners define the UV plane window which will be mapped onto the viewport after the projection from 3D XYZ coordinates to 2D UV coordinates has been performed. There is an implied window-center at [(umin+umax)/2, (vmin+vmax)/2)).

Eye-position sets the point from which to view the 3D terminal space. For perspective projection, the center of projection is located at [(eye-position)+(window-center)] in the UVW coordinate system. For parallel projection, the direction of projection is given by the direction of the eye-position vector in the UVW coordinate system.

Projection-type determines whether the 3D to 2D projection will be a parallel projection in the window-center to eye-position direction or a perspective projection with the center of projection at eye-position.

Graphics information whose W-coordinate is outside the range [back-distance, . . . , front-distance] is not displayed, but is "clipped" off at the clipping plane boundaries.

The view-motion-radius defines a "UV-sphere" tangent to the UV Plane at the window-center and on the +W side of the UV-Plane with a radius of curvature of view-motion-radius. Local 3D "panning" can be done around the UV sphere which, in general will cause changes in the values of view-reference-point, view-plane-normal and view-up.

DESCRIPTION OF ALGORITHM

Begin
{data types: Q, R, S, T are 4 by 4 matrices $\underline{VPN}$, $\underline{VPN}$, $\underline{VUP}$, $\underline{EYE}$, $\underline{U}$, $\underline{V}$, $\underline{W}$ are 3 element vectors XView-Corner, YViewCorner, ZViewCorner, XViewSize, YViewSize, ZViewSize, Wnear, Wfar, LLu, LLv, URu, URv, WCu, WCv, DeltaU, DeltaV, EyeU, EyeV, EyeW, Radius, ProjectionType are integer values.}

If procedure ViewingTransform called directly then
  VRP: =@VRP
  VPN: =@VPN
  VUP: =@VUP
End-If
Radius: =View-Motion-Radius
LLu: =@LLu
LLv: =@LLv
URu: =@URu
URv: =@URv
WCu: =(LLu+URu)/2 {The u component of the UV-window center}
WCv: =(LLv+URv)/2 {The u component of the UV-window center}
DeltaU: =URu−LLu {The width of the UV-window}
DeltaV: =URv−LLv {The height of the UV-window}
EyeU: =@EYE(1)
EyeV: =@EYE(2)
EyeW: =@EYE(3)
ProjectionType: =@ProjectionType
XViewCorner: =@XViewCorner
YViewCorner: =@YViewCorner
ZViewCorner: =@ZViewCorner
XViewSize: =@XViewSize
YViewSize: =@YViewSize
ZViewSize: =@ZViewSize
Wnear: =@FrontDistance
Wfar: =@BackDistance

[I] Calculate transformation matrix from XYZ into UVW space [A] Calculate the upper left 3×3 portion of a matrix Q that rotates the coordinate system so that axis 3 is along VPN, and VUP is in the 1,2 plane. Make it a left-handed system.

$$\text{Set } Q := \begin{pmatrix} U(1) & U(2) & U(3) & 0 \\ V(1) & V(2) & V(3) & 0 \\ W(1) & W(2) & W(3) & 0 \\ 0 & 0 & 0 & 1 \end{pmatrix}$$

where W(1), W(2) and W(3) are the components of the vector
$$\vec{W} := \vec{VPN} / \|\vec{VPN}\|,$$

U(1), U(2) and U(3) are the components of the vector $$\vec{U} := (\vec{VPN} \times \vec{VUP}) / \|\vec{VPN} \times \vec{VUP}\|,$$

and V(1), V(2) and V(3) are the components of the vector $$\vec{V} := \vec{U} \times \vec{W}$$

[B] Translate view-reference-point to the origin $$\text{Set } R := \begin{pmatrix} 1 & 0 & 0 & 0 \\ 0 & 1 & 0 & 0 \\ 0 & 0 & 1 & 0 \\ -\text{VRP}(1) & -\text{VRP}(2) & -\text{VRP}(3) & 1 \end{pmatrix}$$

[C] Calculate the resulting transformation matrix:

T: =R*Q {matrix multiply}

[D] Calculate the transform needed to place the UV window center at the origin and shear the coordinate space so that the center-of-projection (eye position) is aligned above the origin.

$$\text{Set } R := \begin{pmatrix} 1 & 0 & 0 & 0 \\ 0 & 1 & 0 & 0 \\ -(\text{EyeU}/\text{EyeW}) & -(\text{EyeV}/\text{EyeW}) & 1 & 0 \\ -\text{WCu} & -\text{WCv} & 0 & 1 \end{pmatrix}$$

[E] Calculates the resulting XYZ to UVW transformation matrix:

S: =T*R {matrix multiply}

[II] If perspective projection, then change the R matrix to account for perspective
If ProjectionType=2 {perspective} then
  [A] Set up the perspective matrix $$\text{Set } T := \begin{pmatrix} 1 & 0 & 0 & 0 \\ 0 & 1 & 0 & 0 \\ 0 & 0 & C1 & -1/\text{EyeW} \\ 0 & 0 & C2 & 1 \end{pmatrix}$$

where
C1=−(Wnear+Wfar−EyeW)/EyeW
C2=(Wnear*Wfar)/EyeW

[B] Calculate the resulting transformation matrix:

S: =S*T {matrix multiply}

[III] Calculate transformation matrix from UVW space into screenviewport space
  Since the window ceiling center is at the origin, we must move it back to the window ceiling center, i.e.

<1> Translate(+WCu, +WCv).

Then we move the lower left-hand corner to the origin:

<2> Translate(−LLu, −LLv).

Then we move the hither plane to the W=0 plane.

<3> Translate (0, 0, −Wnear)

We multiply each coordinate by the appropriate window-to-viewport scale factors Sx,Sy or Sz. Then we move the image to the location of the viewport by <4>
  Translate(+XViewCorner,+YViewCorner,+−ZViewCorner).

The result is $$\text{Set } S := \begin{pmatrix} 1 & 0 & 0 & 0 \\ 0 & 1 & 0 & 0 \\ 0 & 0 & 1 & 0 \\ WCu-LLu & WCv-LLv & -Wnear & 1 \end{pmatrix} \times$$

$$\begin{pmatrix} Sx & 0 & 0 & 0 \\ 0 & Sy & 0 & 0 \\ 0 & 0 & Sz & 0 \\ 0 & 0 & 0 & 1 \end{pmatrix} \times$$

$$\begin{pmatrix} 1 & 0 & 0 & 0 \\ 0 & 1 & 0 & 0 \\ 0 & 0 & 1 & 0 \\ X\text{ViewCorner} & Y\text{ViewCorner} & Z\text{ViewCorner} & 1 \end{pmatrix} =$$

$$\begin{pmatrix} Sx & 0 & 0 & 0 \\ 0 & Sy & 0 & 0 \\ 0 & 0 & Sz & 0 \\ Sx' & Sy' & Sz' & 1 \end{pmatrix}$$

where
$Sx' = Sx*(WCu-LLU) + X\text{ViewCorner}$
$Sy' = Sy*(WCv-LLv) + Y\text{ViewCorner}$
$Sz' = Z\text{ViewCorner}$
and
$Sx = X\text{ViewSize}/\text{DeltaU}$
$Sy = Y\text{ViewSize}/\text{DeltaV}$
$Sz = Z\text{ViewSize}/(W\text{far} - W\text{near})$

[B] Create the resulting transformation matrix:

$R := S*T$ {matrix multiply}

[IV] Give the homogeneous viewing-transform matrix R to the vector generator
End Procedure ViewingTransform While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A three-dimensional panning method comprising the steps of:
    storing applied graphic information representing a three-dimensional object in a first three-dimensional coordinate modeling space;
    defining a second three-dimensional coordinate space as a viewing space from which the object may be viewed, the viewing space being movable at a selected radial distance around a selected reference point in the modeling space;
    inputting and storing further information including panning information specifying a position from which to view the object;
    moving the viewing space to the specified position in response to the panning information, effecting a transform of the coordinates of the object to the viewing space and to a two-dimensional coordinate screen space; and
    displaying a two-dimensional image of the transformed coordinates, providing a view of the object from the panned-to-position.

2. The method of claim 1 where the step of moving the viewing space includes the step of orienting said viewing space with respect to the object, by varying at least one of pitch, yaw, and roll attitudes of said viewing space.

3. The method of claim 1 where the step of inputting further information includes the step of identifying a center of projection relative to the specified view position.

4. The method of claim 1 where the step of inputting further information includes the step of specifying a radial distance at which the object may be viewed.

5. The method of claim 1 where the step of inputting further information includes the step of specifying viewing window size as a degree of magnification of the displayed image.

6. The method of claim 1 where the step of inputting further information includes the step of specifying one of parallel and perspective transforms.

7. Apparatus for performing a three-dimensional panning operation, comprising:
    memory means for storing entered information including applied graphic and panning information and a control program, the graphic information representing a three-dimensional object in a first three-dimensional coodinate modeling space;
    input means for entering information including panning information for panning to a selected position from which to view the object;
    processing means coupled to the input and memory means, and responsive to the panning information and execution of the program, for defining a second three-dimensional coordinate space as a viewing space from which the object may be observed, and for moving the viewing space, a selected radial distance around a selected reference point in the modeling space, to the selected position, effecting a transform of the coordinates of the object to the viewing space and to a two-dimensional coordinate screen space; and
    means for displaying a two-dimensional image of the transformed coordinates, providing a view of the object from the panned-to position.

8. The apparatus of claim 7 wherein the processing means includes a means for orienting the viewing space with respect to the object, by varying at least one of pitch, yaw, and roll attitudes of said viewing space.

9. The apparatus of claim 7 wherein the input means includes a means for identifying a center of projection relative to the selected view position.

10. The apparatus of claim 7 wherein the input mean includes a means for specifying a radial distance at which the object may be viewed.

11. The apparatus of claim 7 wherein the input means includes a means for specifying a view window size as a degree of magnification of the displayed image.

12. The apparatus of claim 7 wherein the input means includes a means for specifying one of parallel and perspective transforms.

* * * * *